United States Patent

[11] 3,542,186

[72] Inventors Kenneth M. Allen,
 Chester H. Harper; Foye H. Harper,
 Newberg, Oregon
[21] Appl. No. 713,584
[22] Filed March 18, 1968
[45] Patented Nov. 24, 1970
[73] Assignee Allen-Harper, Inc.
 Newberg, Oregon
 a corporation of Oregon

[54] VIBRATING CONVEYORS
 9 Claims, 5 Drawing Figs.
[52] U.S. Cl. .............................................. 198/220
[51] Int. Cl. .............................................. B65g 27/04
[50] Field of Search ........................... 198/220C10,
 220D22, 220D20

[56] References Cited
 UNITED STATES PATENTS
 786,337 4/1905 Zimmer .............. 198/220(D20)UX
 3,122,930 3/1964 Allen ................. 198/220(D22)UX
 3,251,457 5/1966 Dumbaugh ......... 198/220(D22)UX FOREIGN PATENTS
210,460 1/1967 Sweden ................. 198/220(D22)
665,268 6/1963 Canada ................. 198/220(D20)

Primary Examiner—Gerald M. Forlenza
Assistant Examiner—George F. Abraham
Attorney—Buckhorn, Blore, Klarquist and Sparkman ABSTRACT: Conveyor beds 10 and 12 (FIGS. 1 to 3) supported by fiberglass struts 14 and 16 are driven 180° out of phase by an eccentric drive 18 through fiberglass coupling flexures 20 and 22 at from 50 percent to 90 percent of the resonant frequency of each conveyor. The lower ends of the coupling flexures 20 and 22 are clamped to pairs of connecting rods 30 and 32 and the upper ends of the flexures are clamped to crossbeams 34 and 36 of drive brackets 38 and 40. In FIG. 4, connecting rods 100 of a drive 102 are clamped to parallel coupling flexures 104 and 106 clamped to crossbeams 108 and 110 fixed to a drive bracket 112 secured to flanges 114 of a conveyor bed 116. In FIG. 5, connecting rods 200 of a drive 202 are connected to struts 204 clamped to crossbeams 206 and 208.

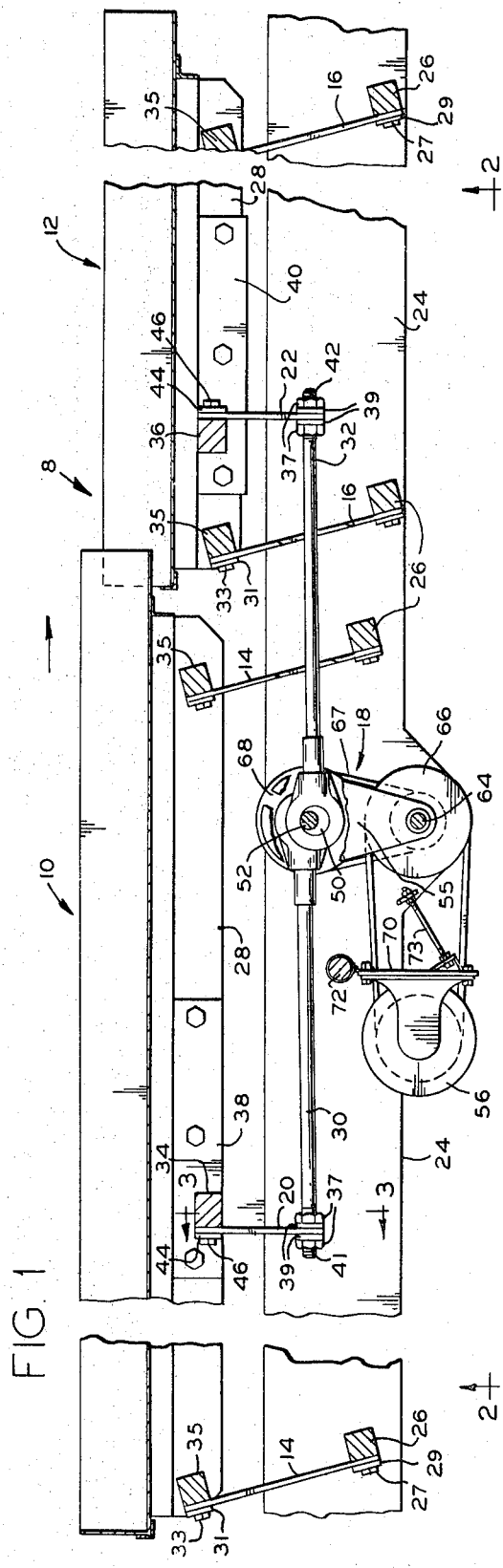

Patented Nov. 24, 1970
3,542,186
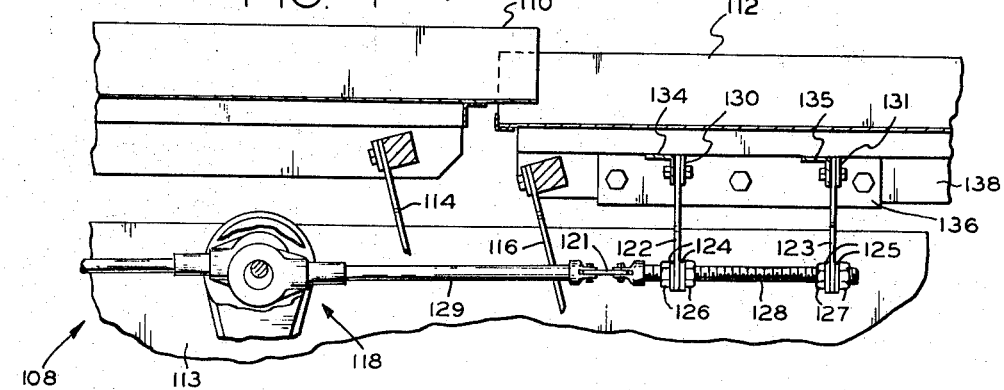
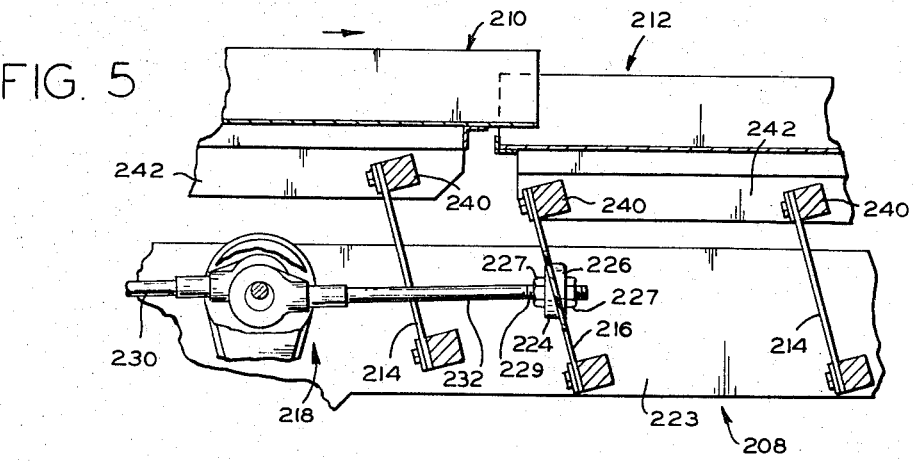
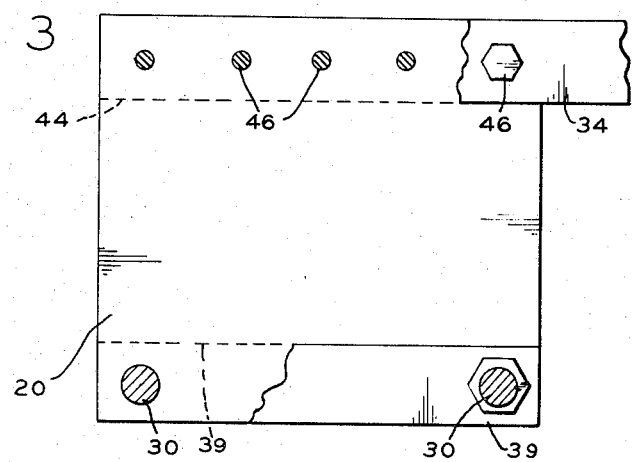
KENNETH M. ALLEN
CHESTER H. HARPER
FOYE H. HARPER
INVENTORS
BY
BUCKHORN, BLORE, KLARQUIST & SPARKMAN
ATTORNEYS 3,542,186

VIBRATING CONVEYORS

DESCRIPTION

This invention relates to improved vibrating conveyors, and more particularly to improved driving mechanisms for vibrating conveyors.

An object of the invention is to provide new and improved vibrating conveyors.

Another object of the invention is to provide new and improved driving mechanisms for vibrating conveyors.

A further object of the invention is to provide a vibrating conveyor having a fiberglass strip generally transverse to a conveyor bed and coupling a drive to the conveyor bed.

Another object of the invention is to provide a coupling flexure connecting a drive to a conveyor bed and which has long life and is easily installed, removed and replaced by either a stronger or a weaker flexure.

The invention provides a vibrating conveyor which includes a conveyor bed driven by an oscillating drive through a fiberglass flexure strip extending generally transversely to the conveyor bed. The conveyor bed preferably is supported by inclined fiberglass struts clamped thereto and to a base. In a vibrating conveyor forming an alternate embodiment of the invention, a connecting rod of a drive is clamped to the ends of a pair of parallel fiberglass coupling flexures also clamped to a conveyor bed and extending generally transversely of the conveyor bed. In another vibrating conveyor forming an alternate embodiment of the invention, a connecting rod of a drive is clamped to the central portion or portions of one or more inclined fiberglass struts supporting a conveyor bed for oscillation.

In the drawings:

FIG. 1 is a fragmentary, vertical sectional view of an improved vibrating conveyor forming one embodiment of the invention;

FIG. 2 is a bottom plan view taken along line 2–2 of FIG. 1;

FIG. 3 is an enlarged vertical sectional view taken along line 3–3 of FIG. 1;

FIG. 4 is a fragmentary vertical sectional view of an improved vibrating conveyor forming an alternate embodiment of the invention; and FIG. 5 is a fragmentary vertical sectional view of an improved vibrating conveyor forming an alternate embodiment of the invention.

Referring now in detail to the drawings, there is shown in FIGS. 1 and 2 an improved vibrating conveyor 8 forming one embodiment of the invention and including a pair of channel like conveyor beds 10 and 12 supported by pairs of parallel, inclined, fiberglass (glass fiber reinforced plastic material) struts 14 and 16. The conveyor beds are driven 180° out of phase by a floating eccentric drive 18 through fiberglass coupling flexures 20 and 22 at from about 50 percent to about 90 percent of the resonant frequency of each conveyor system. The flexures are sheets of plastic material reinforced by glass fibers extending lengthwise thereof. A frame including longitudinal members 24 supports the drive, and also supports lower crossbeams 26 to which the lower end portions of the struts 14 and 16 are clamped by bolts 27 and strips 29. The upper end portions of the struts 14 and 16 are clamped by bars 31 and bolts 33 to upper crossbeams 35 fixed to side flanges 28 of the conveyor beds 10 and 12. The struts 14 and 16 are inclined relative to the conveyor beds 10 and 12 and are parallel to each other. The struts are shown in the normal or mid positions thereof which are relatively unstressed and resist oscillations of the conveyor beds with a double cantilever effect.

The lower end portions of the coupling flexures 20 and 22 are clamped by nuts 37 between clamping bars 39 on threaded end portions 44 and 46 of the connecting rods 30 and 32. The upper end portions of the coupling flexures are clamped by bars 41 and bolts 42 to crossbeams 34 and 36 of drive brackets 38 and 40. The flexures 20 and 22 are shown in their normal, substantially unstressed, mid positions in which they lie in substantially vertical planes, and couple the connecting rods to the conveyor beds with substantially a double cantilever effect. If desired the connection to either the beams 34 and 36 or to the connecting rods 30 and 32 could be a pivotal joint, but this would substantially halve the spring forces coupling the connecting rods to the conveyor beds, and stiffer flexures would be required.

The two connecting rods 30 are driven by two eccentrics 50 keyed to a shaft 52 in phase with each other, and the two connecting rods 32 are driven by two eccentrics 54 (FIG. 2) keyed to the shaft 52 in phase with each other and 180° out of phase with the eccentrics 50. The shaft 52 is journaled in bearings carried by parallel arms 55 keyed to a shaft 64 rotatably supported by the frame members 24 so as to enable floating movement of the shaft 52 longitudinally of the conveyors. The shaft 52 is driven by an electric motor 56 through an adjustable V-belt pulley 58 on the motor shaft, a V-belt 60, an adjustable V-belt pulley 62 journaled in the shaft 64, a pulley 66 secured to the pulley 62, a V-belt 67 and a pulley 68 keyed to the shaft 52. The shaft 64 is journaled in bearings (not shown) carried by the frame members 24. The motor is mounted on a plate 70 pivotally supported on a rod 72 fixed to the frame members 24 and extending therebetween with an adjustable rod 73 connecting the plate 70 adjustably to the frame members 24. The pulleys 58 and 62 are adjustable to drive the shaft 52 at any desired speed in a conventional manner by pivotally moving the motor about to support rod 72 by any suitable means (not shown).

The spring constant of each coupling flexure 20 and 22 should be not substantially less than one-third of the total spring constant of the struts 14 or of the struts 16, that is, the spring constants of the struts 14 or of the struts 16 added together, and preferably is from one-half to twice the total spring constant of the struts 14 or the struts 16. In a very efficient constructed conveyor, the spring constants of the flexures 20 and 22 were equal and were equal to the total spring constant of the supporting struts 14 and 16, the total spring constant of the struts 14 being equal to that of the struts 16. The weight of each conveyor bed 10 and 12 in pounds should be between about 4 percent and 15 percent of the combined total spring constant of the struts 14 and the flexure 20 (or the struts 16 and the flexure 22) in pounds per inch of movement of the conveyor bed. Preferably, to provide ideal amplification of the throw of the conveyor bed over the throw of the eccentric drive, the weight of the conveyor bed 10 or 12 should be about 7 percent of the total spring constant of the struts supporting the conveyor bed plus the spring constant of the flexure associated with each bed. The drive 18 should be driven at a speed between about 50 percent and about 90 percent of the resonant frequency of each of the two opposed and balanced conveyor structures, which resonant speed should be, for best operation, between 400 and 1,500 cycles per minute, and preferably is between 650 and 950 cycles per minute. When operated in the range of from 50 percent to 90 percent of such resonant speeds, the throw of the conveyor beds was substantially greater than the throw of the drive 18 for a large part of that range and the throw increased substantially whenever the speed of operation was increased within that range. Also, the throw for a given speed did not change appreciably over a wide range of load of material being conveyed.

In one successful constructed conveyor forming one embodiment of the invention, the weight of the conveyor bed 10 and its elements 28, 34, 35 and 38 was about 155 pounds, there were 10 struts 14 arranged in pairs, each strut 14 was 2 inches wide, 8¼ inches long and one-quarter inch think and was composed of epoxy material reinforced by primarily longitudinally extending glass fibers, the flexure 20 was 5 inches wide, 4 inches long and three-sixteenths inch thick and was composed of epoxy material reinforced by primarily longitudinally extending glass fibers. The throw of the drive was three-eighths inch and throw of the conveyor bed 10 at 650 cycles per minute was seven-eights inch.

In another successful constructed conveyor forming another embodiment of the invention, the weight of the conveyor bed 10 and its associated stiffening elements was about 60 pounds, there were four fiberglass struts 14 each 2 inches wide, 8 inches long and one-quarter inch thick, the flexure 14 was 1¾ inches wide, 4 inches long and was three-sixteenth inch thick. The conveyor operated very well at speeds of from 550 cycles per minute to 800 cycles per minute with a throw of from one-fourth inch to 1⅛ inch, the throw of the drive 18 being three-eights inch.

EMBODIMENT OF FIG. 4

A vibrating conveyor 108 forming an alternate embodiment includes conveyor beds 110 and 112 supported on a base 113 by pairs of parallel, inclined, fiberglass struts 114 and 116 and driven 180° out of phase by a floating drive 118 through pairs of parallel coupling flexures illustrated by a pair of parallel fiberglass coupling flexures 122 and 123 clamped between clamping bars 124 and 125 and nuts 126 and 127 screwed onto rigid threaded rods 128. A laterally flexible joint 121 pivotally connects connecting rod 129 to the rods 128. The upper end portions of the flexures 122 and 123 are clamped rigidly by bars 130 and 131 and bolts 132 and 133 to crossbeams 134 and 135 of a rigid drive bracket 136 bolted to flanges 138, which are rigid with the conveyor bed 112. The flexures are normally at right angles with the conveyor bed 112, and normally lie in vertical planes. Except for the coupling structures just described, the conveyor 108 is identical with the conveyor 8 (FIGS. 1 and 2) both in construction and in operation.

EMBODIMENT OF FIG. 5

A conveyor 208 forming an alternate embodiment of the invention shown in FIG. 4 is identical to that of FIGS. 1 and 2 except that connecting rods 230 and 232 of a floating drive 218 are connected to the central portions of struts 214 and 216, which form the sole supports of conveyor beds 210 and 212 and are mounted on a base 223. Rigid, opposed clamping bars 224 and 226 and nuts 227 on threaded portions 229 of the rods 230 and 232 secure the rods rigidly to the pairs of parallel, inclined, fiberglass struts 214 and 216. The pairs of the struts 214 and 216 to which the connecting rods are secured serve both as resilient supports for the conveyor beds and as resilient coupling flexures connecting the drive 218 to the conveyor beds. Preferably the pairs of struts 214 and 216 to which the connecting rods 230 and 232 are connected have substantially greater spring constants than do the remaining pairs of struts 214 and 216 so that the effective spring constant of the resilient coupling of the connecting rods 232 to the conveyor bed 212 is not substantially less than one-quarter of the total spring constant of all the struts 216 and the same relationship is true relative to the connecting rods 230 and the struts 214. Preferably the ratio of the spring constant of the coupling flexure portions of the struts 216 to the total spring constant of all the struts 216 is at least 1:3 and 1:2 is optimum. The length of the portions of the struts 216 between the clamping bars 224 and 226 and crossbeams 240, which are secured to longitudinal flanges 242 of the conveyor beds 210 and 212 should, like the lengths of the flexures 20, 22, 122 and 123, be sufficiently great to provide for an amplification of throw of each conveyor bed of several times that of the throw of the drive 218.

The above-described flexures 20, 22, 122, 123, 214 and 216 are very durable, are easily installed and removed, and may be easily replaced for controlled, easily calculated changes in spring constants, since the spring constants very linearly with variation in the widths thereof. Thus, the conveyors may be easily changed to tailor them to widely varying products.

It is to be understood that the above-described arrangements are simply illustrative of the application of the principles of the invention. Numerous other arrangements may be readily devised by those skilled in the art which will embody the principles of the invention and fall within the spirit and scope thereof.

We claim:
1. In a vibrating conveyor:
 a conveyor frame;
 an elongated conveyor bed member;
 resilient support means between the bed member and the frame for supporting the bed member for oscillating movement generally longitudinally of the bed member;
 an oscillating drive means supported by the frame independently of the bed member;
 a connecting rod member extending in a direction longitudinally of the bed member and having one end connected to the drive means;
 elongated resilient flexure means extending generally at right angles to the bed member and being shorter in length than the said support means;
 first connecting means at one end of the flexure means for connecting the flexure means to the bed member;
 and second connecting means at the other end of the flexure means for connecting the flexure means to the other end of the connecting rod member; and
 said flexure means being free of any direct connection with the frame at least one of the first and second connecting means being a clamping means clamping an end of the flexure means to one of the members.

2. The vibrating conveyor of claim 1 wherein the first and second connecting means clamp the flexure means to the rod member and the bed member, respectively.

3. The vibrating conveyor of claim 1 wherein the support means includes a plurality of resilient struts inclined relative to the conveyor bed.

4. The vibrating conveyor of claim 1 wherein the flexure means consists of a single sheet of fiberglass.

5. The vibrating conveyor of claim 1 wherein the flexure means includes a plurality of parallel sheets of fiberglass.

6. The vibrating conveyor of claim 5 wherein the parallel sheets of fiberglass are spaced from each other and the second connecting means includes clamping means clamping the sheets of fiberglass rigidly to spaced apart portions of the connecting rod member.

7. The vibrating conveyor of claim 3 wherein the spring constant of the flexure is at least one-third that of the struts.

8. The vibrating conveyor of claim 3 wherein the spring constant of the flexure is from one-half to twice that of the struts.

9. The vibrating conveyor of claim 3 wherein the spring constants of the flexure and the struts are substantially equal.